United States Patent [19]

Spridco et al.

[11] Patent Number: 5,095,767
[45] Date of Patent: Mar. 17, 1992

[54] MULTI-CONFIGURATION GEAR REDUCER KIT

[75] Inventors: Dale R. Spridco, DeForest; J. Marc Gruneberg, Madison, both of Wis.

[73] Assignee: GearTechnic Corporation, Madison, Wis.

[21] Appl. No.: 572,204

[22] Filed: Aug. 23, 1990

[51] Int. Cl.⁵ ............................................. F16H 3/02
[52] U.S. Cl. ................................... 74/397; 74/421 A; 74/606 R; 248/188.2
[58] Field of Search ............... 74/421 A, 421 R, 392, 74/393, 397, 606 R, 640; 248/916, 648, 188.2

[56] References Cited

U.S. PATENT DOCUMENTS

| Re. 20,925 | 11/1938 | Rees | 248/188.2 |
|---|---|---|---|
| 2,436,746 | 2/1948 | Drought | 74/397 |
| 2,596,794 | 5/1952 | Schmitter | 74/421 A |
| 2,911,169 | 11/1959 | Contreras | 248/188.2 |
| 2,926,542 | 3/1960 | Schmitter et al. | 74/421 A |
| 2,950,635 | 8/1960 | Bieger et al. | 74/606 R |
| 2,957,360 | 10/1960 | Kripke | 74/421 A |
| 3,009,366 | 11/1961 | Roberts | 74/606 R |
| 3,011,358 | 12/1961 | Moore | 74/606 R |
| 3,073,176 | 1/1963 | Daugirdas | 74/421 A |
| 3,187,209 | 6/1965 | Schmitter | 74/421 A |
| 4,802,372 | 2/1989 | Harrod et al. | 74/421 A |
| 4,809,421 | 3/1989 | Justice | 248/188.2 X |
| 4,811,616 | 3/1989 | Henderson | 74/421 A |
| 4,858,865 | 8/1989 | Schrepfer | 248/188.2 |

Primary Examiner—Leslie A. Braun
Assistant Examiner—Matthew Stavish
Attorney, Agent, or Firm—Quarles & Brady

[57] ABSTRACT

A gear reducer kit has one shaft mounted in a rotatable quill which rotates along an axis offset from the shaft axis. The quill may be fixed with respect to the gear reducer at one of several discrete index position, each associated with a different input pinion gear corresponding to the distance between the shaft and an idler gear. A flange rim guides the rotation of the quill mode with respect to the housing. The idler gear is opposed to the mounting base of the gear reducer with respect to the shaft to permit spacing plates to be added to adjust the mounting spacing.

13 Claims, 4 Drawing Sheets

MULTI-CONFIGURATION GEAR REDUCER KIT

FIELD OF THE INVENTION

The present invention relates to gear reducers, and particularly to a kit for making a gear reducer that will fit many difference applications.

BACKGROUND OF THE INVENTION

Gear reducers are well-known and commonly available mechanical devices for altering the speed and torque of a rotating drive, typically placed between a motor and a mechanically driven device. Gear reducers generally include a housing and an input and output shaft which are rotatably supported by the housing. Reduction gearing inside the housing forms a drive train connecting the input and output shafts and defining the "gear-ratio", that is, the ratio between the angular motion of the input shaft with respect to the angular motion of the output shaft.

Many different gear-ratios are available. For example, the American Gear Manufacturers Association (AGMA) has adopted 13 different standard ratios from 5.062:1 to 57.66:1.

A gear reducer may be shaft mounted, flange mounted or foot mounted, depending on the configuration of the housing. Any gear-ratio may be used with either mounting type resulting in many different possible gear reducer variations. Typically this variety requires that a supplier stock many different gear reducers so as to be able to supply customers with a variety of gear ratios.

With foot mounting, the housing of the gear reducer includes a mounting base which is attached to some fixed support relative to the machinery associated with the gear reducer. With shaft mounting, the housing of the reducer includes a mounting collar that attaches directly to the associated machinery. In either case, the mounting ensures proper alignment between the input and output shaft and the associated machinery during operation of the gear reducer.

Depending on the manufacturer, the position of the output shaft with respect to the mounting base and the location of the mounting holes in the mounting base will vary. For this reason, foot mounted gear reducers of one manufacturer are not generally interchangeable with gear reducers from another manufacturer without extensive modification of the mounting arrangement.

SUMMARY OF THE INVENTION

The present invention provides a kit for making a gear reducer which may be assembled, from stocked subassemblies with simple hand tools and minimal training, to have one of several gear-ratios. The kit includes a housing sub-assembly, two rotating shafts, and a quill module to support interchangeable gears. One shaft is supported to rotate about a first axis by a quill module which is received by the housing and which may be rotated relative to the housing about a second axis which is spaced apart radially from the first axis. The housing and quill module may be fixed against rotation and relative to each other at one of several discrete angular index positions.

The shaft held by the quill module extends into the housing and may be fitted with one of several interchangeable gears of different pitch diameters, each interchangeable gear sized to allow the interchangeable gear to mate with a mating gear of a drive train when the quill module and housing are fixed in one of the index positions.

One object of the invention, therefore, is to provide a gear reducer kit with a limited number of sub-assemblies that may be assembled to provide a range of gear-ratios. The different gear-ratios are obtained with a few interchangeable gears which may be attached to the quill module. The quill module rotates with respect to the gear reducer housing to provide the necessary inter-gear spacing. For a given motor size, the adjustability of the housing and quill module permits the final assembly of a gear reducer, having one of a variety of gear ratios, from a selection of interchangeable gears.

The ability to position the quill in one of several discrete and fixed index positions and the use of interchangeable gears corresponding to those index positions ensures that the clearances between the gears is correct without the need for special measurements or adjustments. In one embodiment, the quill shaft holding the interchangeable gear is cantilevered into the housing, permitting adjustment of the quill module alone to reposition the axis of the interchangeable gear without the need to adjust an independent, second, shaft bearing.

The quill module is held against the housing by means of a flange rim fitting into a pilot aperture to resist radial motion of the quill module when it is fixed at any given index position and to ensure that the shaft in the quill module is aligned with the other gear axes.

Accordingly, another object of the invention is to provide a gear reducer with gear ratios that may be readily adjusted by rotating the quill module among predetermined index positions and yet to ensure that the final, assembled gear reducer is rigid, properly aligned, and that the particular gears have appropriate clearance.

The multiple quill shaft positions may be offset with respect to a "line of centers" between the axis of rotation of the quill module and the axis of rotation of the mating gear so that each index position provides a unique center-to-center distance between the interchangeable gear and the mating gear. This permits the maximum variability of gear-ratios for a given number of index positions.

In one embodiment, the housing includes a mounting base and the mating gear is an idler gear opposite to the mounting base with respect to the input and output shafts.

An additional object of the invention is to permit the gear reducer to be interchangeable with other fixed gear-ratio gear reducers. With the idler gear positioned away from the mounting base, the mounting base may be as close as possible to the output shaft and the mounting dimensions of other gear reducers may be matched by the use of spacing plates attached to the mounting base.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
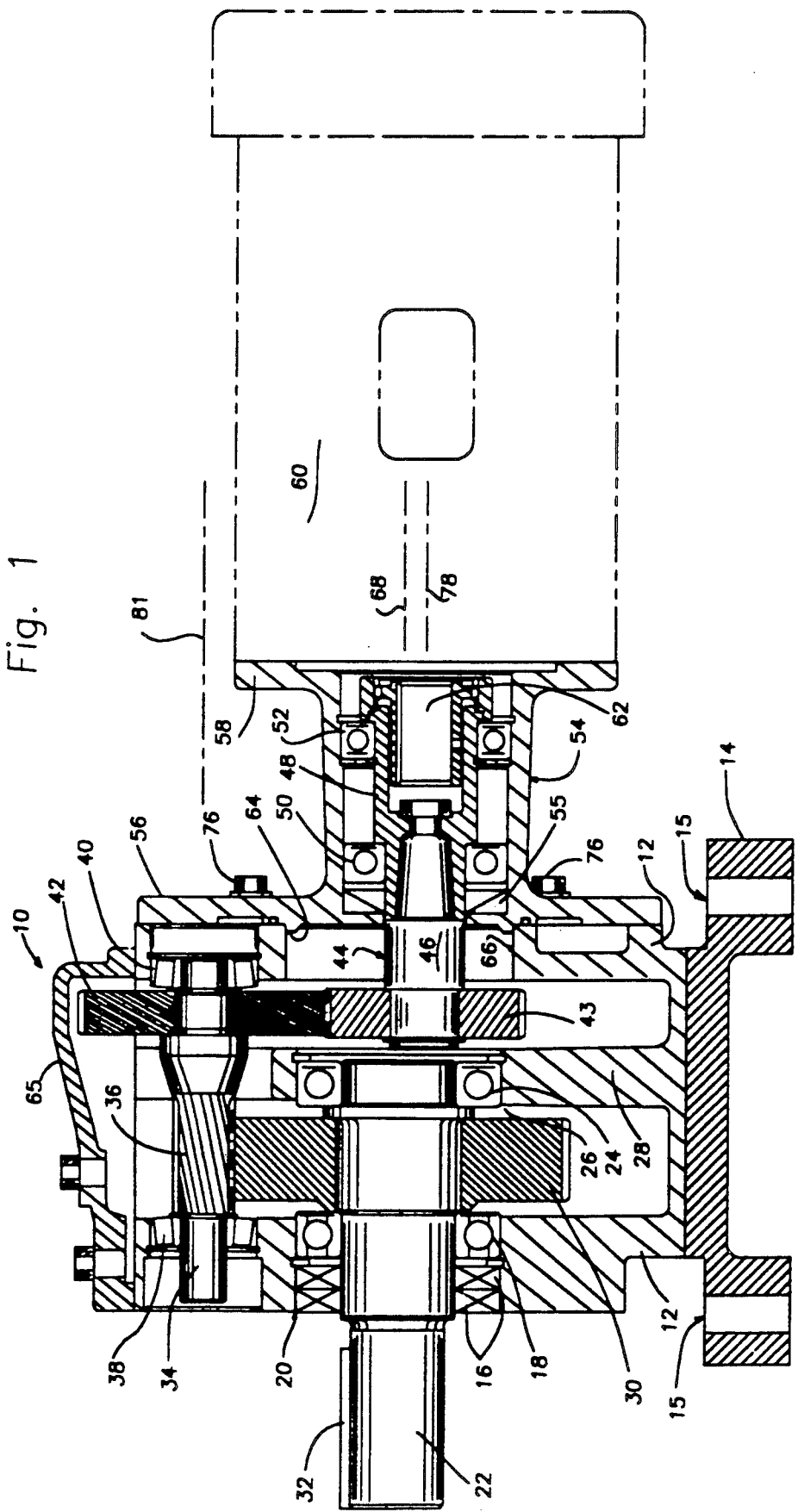
FIG. 1 is a partial cross-sectional view of the gear reducer of the present inventions taken along a plane parallel to the input and output shafts showing the quill module connected between a motor and the reducer housing.

Referring to FIG. 1, a gear reducer kit 10 of the present invention that may be assembled to provide one of several gear ratios includes a gear housing 12 having a mounting base 14 integrally attached to a first, lower face of the housing 12. The mounting base 14 includes four vertically disposed bolt holes 15 of generally oblong cross section, as will be described further below.

Oil seals 16 and ball bearings 18 are held within a aperture 20 formed in a vertical face of the housing 12 perpendicular to the mounting base 14, and surround and support an output shaft 22, which projects both inside and outside of the housing 12. An end of the inside portion of output shaft 22 is supported by a bearing 24 held in an aperture 26 formed in an inner support wall 28 of the housing 12. A length of the output shaft 22 between the ball bearings 18 and the bearings 24 holds an output gear 30 fixedly attached on the output shaft 22. An outside end of the output shaft 22 accepts a key 32 for connection to other rotating machinery in a fashion well known in the art.

An idler shaft 34 is mounted above and generally parallel to the output shaft 22, opposite to the mounting base 14 with respect to the output shaft 22, and within the housing 12. The idler shaft 34 supports an output pinion 36 engaging the output gear 30. The idler shaft 34 is supported at either end by roller bearings 38 and 40, held in correspondingly shaped apertures formed in opposite walls of the housing 12.

The idler shaft 34 extends substantially the length of the housing 12, beyond the inner end of the output shaft 22 and past the inner support wall 28, and has mounted on it, at its far end removed from the output pinion 36, an input gear 42. The input gear 42 engages a interchangeable input pinion 43 attached to an input shaft 44.

In the embodiment of FIG. 1, the input shaft 44 is generally parallel to the output shaft 22 and extends through a wall of the housing 12 opposite to the wall supporting the output shaft 22. The input shaft 44 is constructed of a tapered stub shaft 46 fitting coaxially into a generally cylindrical receiving collar 48, as shown also in FIG. 5. The receiving collar 48 is held by means of coaxial bearings 50 and 52 within a generally cylindrical quill 54. An oil seal 55 surrounds the receiving collar 48 toward the housing 12 end of the quill 54.

The quill 54 surrounds, and extends parallel to, the receiving collar 48 and supports generally perpendicular disk-shaped quill flanges 56 and 58 at either end. The quill flange 56 is attached to the housing 12 and supports the quill 54 with respect to the housing 12, and hence supports the input pinion 43 relative to the input gear 42.

The remaining quill flange 58 is attached to a face of a motor 60, or source of rotational drive, which provides a source of torque to the input shaft 44. The quill flange 58 serves to align the motor shaft 62 with the outermost end of the receiving collar 48, which is bored to receive the motor shaft 62 and which is locked to the motor shaft rotation by means of a key (not shown), as is well known in the art.

The interior of the housing 12 may be filled with lubricant (not shown) through access cover 65 on the top of the housing 12.

The quill flange 56 attachment to the housing 12 includes a circular flange rim 64 projecting from the face of the quill flange 56 toward the housing 12, the flange rim 64 being received within a corresponding pilot opening 66 in the wall of the housing 12, to permit the entire quill module including the quill 54, the quill flanges 56 and 58, the bearings 50 and 52, the input shaft 44, and interchangeable input pinion 43, to rotate with respect to the housing 12 about an axis of rotation which coincides with the center of the flange rim 64 and which is termed here the "quill axis," as further indicated by the reference numeral 68.

Figure 2:
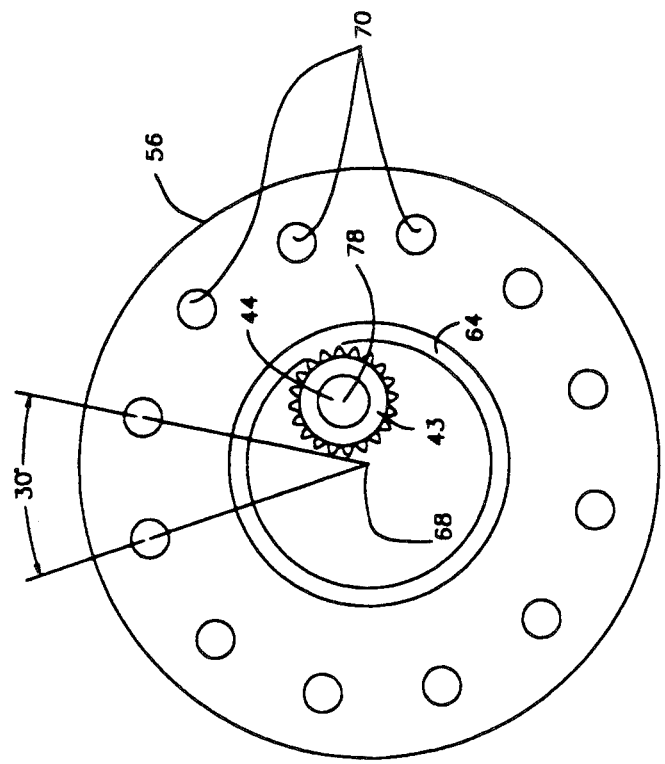
FIG. 2 is an elevation of the reducer flange of the quill module looking toward the motor.
Figure 3:
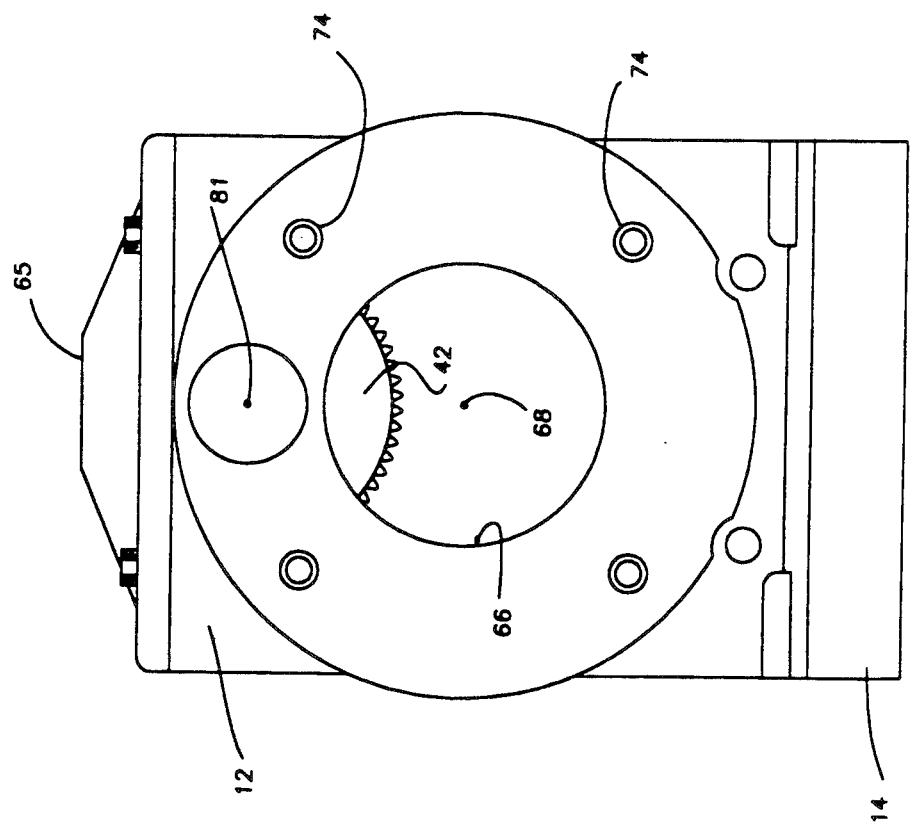
FIG. 3 is an elevation of the housing wall where the reducer flange of the quill module is received.

Referring to FIGS. 2 and 3, the quill flange 58 has twelve holes drilled spaced at a constant radius about the quill axis 68 and at an angular spacing of 30°. A corresponding four holes 74 are drilled and tapped in the wall of housing 12 against which abuts the quill flange 58 when the quill flange 58 is attached to the housing 12. The four holes 74 are positioned at 90° intervals, and at the same radius with respect to the quill axis, as holes 70 so that the quill flange 56 may be rotated with respect to the housing 12 so that exactly four holes 70 in the quill flange 58 will align with the four holes 74 in the housing 12 at certain angular positions of the quill assembly. When such alignment has been achieved, the quill flange 56 may be restrained against rotational movement by four bolts 76 (shown in FIG. 1) passing though the aligned holes 70 and received by the threaded holes 74.

As will be apparent from this description, the quill 54 may be thus fixed at any one of twelve different discrete rotational index positions, each differing from adjacent positions by 30°. It will be noted that the parallel alignment of the input shaft 44 with the output shaft 22 will be preserved for each index position by virtue of the abutting faces of the quill flange 56 and the housing 12, and that translational movement of the quill flange 56 along the face of the housing 12 will be resisted by the flange rim 64 as it interfits with the pilot opening 66, and hence the mounting holes 70 and 74 and bolts 76 need only prevent rotation of the quill 54 along its axis 68. For this reason, the tolerance of the holes 70 and 74 need not be extremely precise.

Referring again to FIG. 2, the axis 78 of the input shaft 44 is radially offset from the quill axis 68. Accordingly, as the quill 54 is rotated, the input shaft axis 78 will remain parallel to, but will move radially with respect to, the axis 81 of the idler shaft 34 (shown in FIG. 3). This movement permits different input pinions 43 having different pitch diameters, as is necessary to achieve different gear-ratios, to properly mesh with input gear 42.

Figure 4:
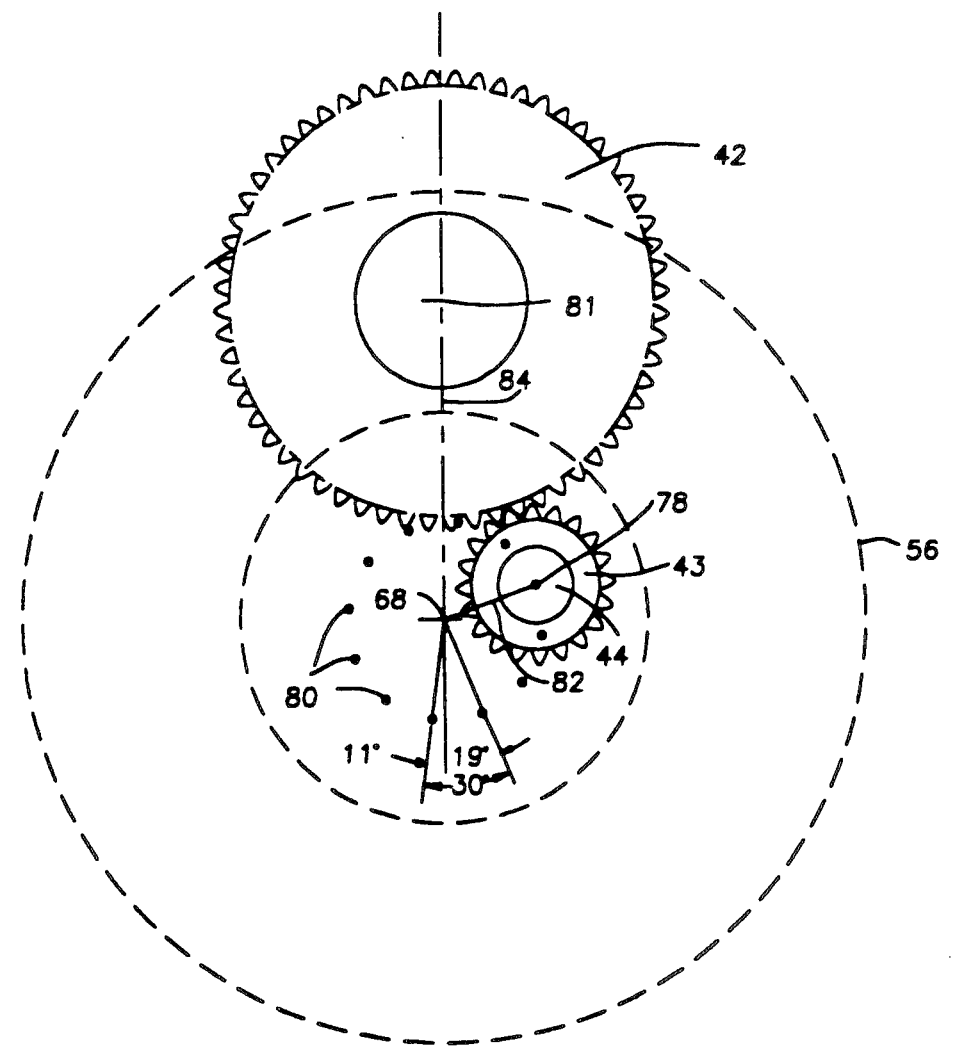
FIG. 4 is a diagram showing the relative positions of the input shaft with respect to the quill axis and idler axis for various index positions and showing the relationship between index positions of the input shaft and a line of centers between the idler axis and the quill axis.

Referring now to FIG. 4, the input shaft axis 78 may be positioned in one of twelve index positions 80 corresponding to the alignment of the holes 70 of the quill flange 56 and the holes 74 of the housing 12. A first line of centers 82 extending perpendicularly between the input shaft axis 78 and the quill axis 68 for each index position 80, and determined generally by the positioning of the input shaft 44 with respect to the quill flange 56 and the relative positions of holes 70 and 72, is offset with respect to a second line of centers 84 extending between the quill axis 68 and the idler axis 81 so that the index positions 81 are not symmetrically disposed about the first line of centers 84. The result of this offset is that each of the index positions 80 provides a unique center-to-center distance between the idler axis 81 and the input shaft axis 78. This permits the twelve index positions 80 to be associated with up to twelve different interchangeable pinions 43 to provide twelve different gear-ratios for the gear reducer 10.

Each different interchangeable input pinion 43 is sized to provide a different gear-ratio and requires a different index position 80 and to provide the proper clearance between the interchangeable the input pinion 43 and the input gear 42 for that particular gear ratio. As noted above, the guidance provided by the flange rim 64 and pilot opening 66 permits very accurate positioning of the interchangeable input pinion 43 with respect to the input gear 42 for each index position 80.

Figure 5:
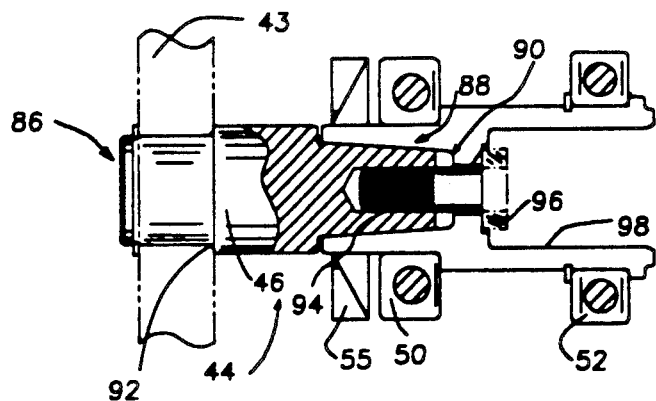
FIG. 5 is a partial cross-section of the input shaft showing the connection between a tapered stub shaft and a receiving collar.

Referring to FIG. 5, the each input pinion 43 is attached to a tapered stub shaft 46 having a cylindrical end 86 and a tapered end 88, the latter with with a standard machine taper which is received by a correspondingly tapered axial bore 90 in the receiving collar 48 as held by the quill 54 (not shown in FIG. 5). The pinion gear 43 is press fit to the cylindrical end 86 of the tapered stub shaft 46 against a flange 92 and secured with a snap ring and key (not shown) as is understood in the art. Each pinion 43 is pre-assembled to a tapered stub shaft 46 which may be attached to the receiving collar 48 as follows: The tapered end 88 of the tapered stub shaft 46 is inserted into the tapered bore 90 of the receiving collar 48. A threaded hole 94 drilled axially into the tapered end 88 of the tapered stub shaft 46 receives a bolt 96 extending axially out from the bottom of the tapered bore 90. The head of the bolt 96 is accessible from the end of the receiving collar 48 receiving the motor shaft 62 and seats against the bottom of the bore 98 which receives the motor shaft 62.

Figure 6:
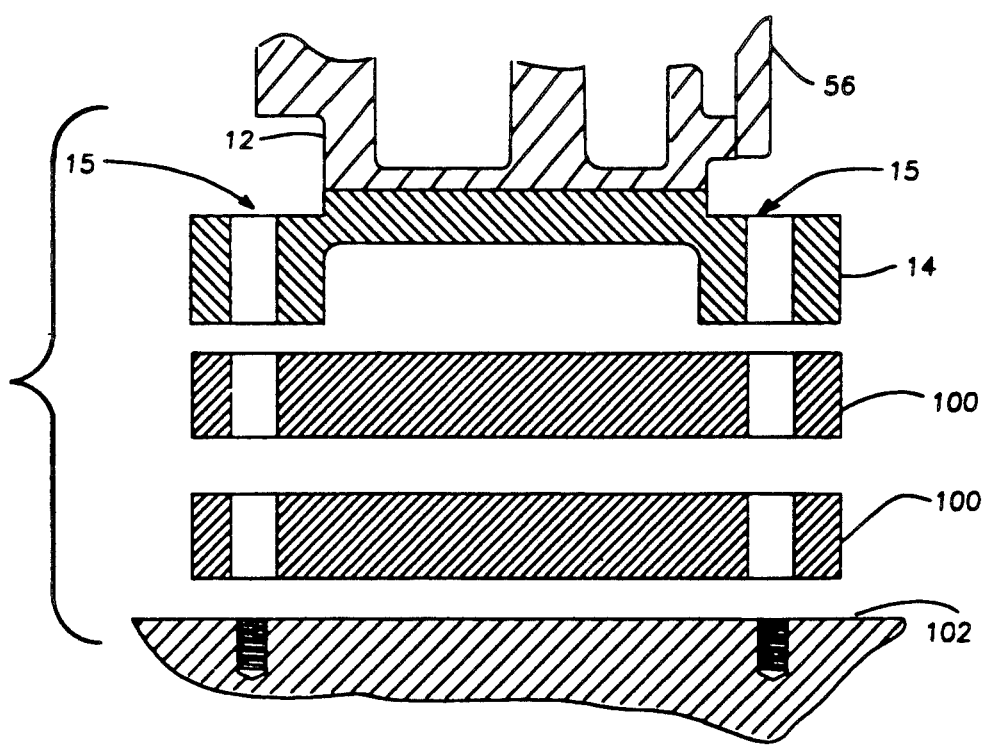
FIG. 6 is an exploded detail of FIG. 1 showing the fitting of the mounting base to spacing plates used to match the mounting base to the mounting dimensions of other manufacturer's gear reducers.

Referring to FIGS. 1 and 6, the idler shaft 34 is positioned above the input and output shafts 22 and 44 with respect to the mounting base 14. This permits the mounting base 14 to be very close to the output shaft 22 and hence for the gear reducer 10 to replace compact fixed gear-ratio reducers either directly or by the addition of a spacing plate 100 without modification to the mounting points to a foundation 102. This ability to replace other manufacturer's units regardless of their ratio or internal design is critical to achieving the benefits of rapid replacement possible with stocked gear reducers and achievable by the present invention.

The gear reduction assembly of the present invention offers particular advantages for suppliers or distributors of machine drive equipment. By stocking a supply of the quill assemblies, a supply of the gear reduction assemblies (i.e. the contents of the housing 12), and a few different size input pinion gears 43, the supplier or distributor can readily assemble gear reduction assemblies of a variety of gear ratios, without having the complexity and cost of stocking a large number of gear reduction assemblies with a variety of gear ratios. Instead, upon an order for one of the standard gear ratios, the supplier or distributor simply installs the appropriately sized pinion gear onto the input shaft 46 on a quill assembly, mounts the quill assembly to the housing 12, and secures the quill assembly in place by bolts through the appropriate four of the holes 70 into the threaded holes 74 in the housing 12. The supplier or distributor can easily be provided with a table of available gear reduction ratios, which would indicate which pinion gear and which angular orientation correspond to each gear ratio. Such gear reduction assembly kits can be provided in a small variety of sizes to cover a large variety of gear ratios and torque ratings, and can be readily altered so as to accommodate various arrangements in the positioning of the output shaft relative to the output shaft of previously supplied equipment. In this way, the supply of gear reduction equipment of varying requirements to the motorized equipment industry can be aided, while minimizing the inventory of parts needed.

The above description has been that of a preferred embodiment of the present invention. It will occur to those who practice the art that many modifications may be made without departing from the spirit and scope of the invention. For example, the above describe arrangement may be readily adapted to shaft mounted gear reducers and the like. In order to apprise the public of the various embodiments that may fall within the scope of the invention, the following claims are made.

I claim:

1. A kit for making a gear reducer, comprising:

a housing;

an input shaft;

an output shaft with an output gear thereon;

a mating gear assembly inside the housing having a pair of gears on a common idler shaft, a first one of the gears on the idler shaft connected to drive the output gear;

a quill module for supporting the input shaft to rotate about a first axis;

means for receiving said quill module on said housing with the input shaft extending into the housing, said means providing for said quill module to be rotated relative to said housing about a second axis which is spaced apart radially from said first axis so that rotation of the quill module on the housing causes the input shaft to vary in distance from the idler shaft;

means defining multiple discrete angular index positions of said quill module relative to said housing about said second axis;

multiple interchangeable input gears for alternative mounting on the input shaft;

wherein each interchangeable input gear corresponds to one of said index positions, each of the interchangeable input gears being of a size to mate with the second gear on the idler shaft in driving engagement when the quill module is rotated relative to the housing to a corresponding index position; and means for securing the quill module in any said index position, whereby by changing the first gear and rotating the quill module, without changing the idler shaft gears and the output gear, the gear reduction ratio of the gear reducer can be selectively altered.

2. A kit as claimed in claim 1, wherein each interchangeable input gear has a pitch diameter different from the pitch diameters of the other interchangeable input gears, each index position placing the first axis and the idler axis a distance apart approximately equal to the average of the pitch diameters of the corresponding interchangeable input gear and the mating gear.

3. The kit as claimed in claim 1, wherein the quill module includes a flange rim for preventing radial motion of the first axis when the quill module is not rotated and for holding the first axis parallel to the second axis when the quill module is received by the housing.

4. A kit as claimed in claim 1, wherein the index position securing means comprises a set of one or more holes in said quill module and a set of one or more holes in said housing, at least one of said quill module holes being registerable with at least one of said housing holes.

5. A kit as claimed in claim 2, wherein the positions of the first axis for each index position are asymmetrically disposed about a line of centers between the second and idler axis.

6. A kit as claimed in claim 1, wherein the quill module cantilevers the input shaft into said housing.

7. A kit as claimed in claim 1, wherein the mating gear assembly is located to one side of the input and output shafts.

8. A kit as claimed in claim 1, wherein the housing includes a mounting base and the mating gear assembly is located in the housing on the opposite side from the mounting base with respect to the input and output shafts.

9. A kit as claimed in claim 8, wherein one of said input and output shafts rotates relative to said housing about a fourth axis.

10. A kit as claimed in claim 8, wherein said fourth axis is coaxial with said second axis.

11. A kit as claimed in claim 7, further comprising spacing plates for attaching the mounting base to a foundation.

12. A kit as claimed in claim 10, wherein spacing plates of different thicknesses may be received by the mounting base for varying the elevation of said housing relative to said foundation.

13. A kit as claimed in claim 1, wherein the interchangeable gears are mounted on the quill module shaft by a tapered stub shaft which fits into a tapered bore in the end of said quill module shaft, said stub shaft and quill module shaft defining means for limiting the penetration of said stub shaft into said quill module shaft and further comprising means for securely said stub shaft in said tapered bore.

* * * * *